(12) United States Patent
Ellerman et al.

(10) Patent No.: US 10,399,616 B2
(45) Date of Patent: Sep. 3, 2019

(54) SPHERICAL MOBILE ROBOT WITH PIVOTING HEAD

(71) Applicant: Spin Master, Ltd., Toronto (CA)

(72) Inventors: Mark Ellerman, Los Angeles, CA (US); Chris Hardouin, Los Angeles, CA (US)

(73) Assignee: Spin Master Ltd., Toronto (CA)

( * ) Notice: Subject to any disclaimer, the term of this patent is extended or adjusted under 35 U.S.C. 154(b) by 248 days.

(21) Appl. No.: 15/235,554

(22) Filed: Aug. 12, 2016

(65) Prior Publication Data

US 2018/0043838 A1   Feb. 15, 2018

(51) Int. Cl.
| | |
|---|---|
| A63H 29/20 | (2006.01) |
| A63H 30/04 | (2006.01) |
| A63H 33/26 | (2006.01) |
| B62D 57/00 | (2006.01) |
| B62D 61/00 | (2006.01) |
| B62D 39/00 | (2006.01) |
| G05D 1/08 | (2006.01) |
| A63H 33/00 | (2006.01) |

(52) U.S. Cl.
CPC .......... *B62D 39/00* (2013.01); *A63H 33/005* (2013.01); *A63H 33/26* (2013.01); *G05D 1/0891* (2013.01); *A63H 2200/00* (2013.01); *G05D 2201/0214* (2013.01); *Y10S 901/01* (2013.01)

(58) Field of Classification Search
CPC ........ B62K 1/00; B62K 11/007; A63H 30/04; A63H 29/20; A63H 33/005; B62D 57/00; B62D 61/00; B60R 2011/0057
USPC ...... 446/456, 458, 460, 462; 180/7.1, 21, 10
See application file for complete search history.

(56) References Cited

U.S. PATENT DOCUMENTS

| 933,623 | A | | 9/1909 | Cecil | |
|---|---|---|---|---|---|
| 1,263,262 | A | | 4/1918 | McFaul | |
| 2,267,254 | A | * | 12/1941 | Reilley | ..................... B60F 3/00 180/21 |
| 2,949,696 | A | | 5/1957 | Easterling | |

(Continued)

FOREIGN PATENT DOCUMENTS

| CN | 20120111 Y | 4/2009 |
|---|---|---|
| CN | 105045265 A | 11/2015 |

(Continued)

OTHER PUBLICATIONS

European Patent Application 17186047.1 Extended Search Report dated Feb. 20, 2017.

(Continued)

*Primary Examiner* — Anne Marie M Boehler
(74) *Attorney, Agent, or Firm* — Erise IP, P.A.

(57) ABSTRACT

A mobile, spherical robot includes a spheroid shell, an internal assembly secured to the shell, and a head disposed atop the shell. The internal assembly is disposed within the shell for propelling the mobile robot. The internal assembly includes a base, a flywheel assembly rotatably secured to the base, a drive assembly rotatably secured to the spheroid shell and configured to propel the mobile robot by rotating the spheroid shell about the base a pivoting arm pivotably secured to the base, and the pivoting arm. The head is secured to the magnetized end of the pivoting arm through the spheroid shell. The head is configured to move relative to the spheroid shell and relative to the base by the pivoting of the pivoting arm.

13 Claims, 7 Drawing Sheets

(56) References Cited

U.S. PATENT DOCUMENTS

| | | | |
|---|---|---|---|
| 2,939,246 A * | 6/1960 | Glos | A63H 5/00 |
| | | | 200/61.52 |
| 4,501,569 A * | 2/1985 | Clark, Jr. | A63H 33/005 |
| | | | 180/21 |
| 4,541,814 A | 9/1985 | Martin | |
| 4,601,675 A | 7/1986 | Robinson | |
| 4,726,800 A | 2/1988 | Kobayashi | |
| 5,072,938 A * | 12/1991 | Shin | A63B 43/04 |
| | | | 473/613 |
| 5,533,920 A * | 7/1996 | Arad | A63H 33/005 |
| | | | 446/409 |
| 5,676,582 A | 10/1997 | Lin | |
| 6,227,933 B1 * | 5/2001 | Michaud | A63H 33/005 |
| | | | 446/458 |
| 6,458,008 B1 * | 10/2002 | Hyneman | A63H 1/00 |
| | | | 446/233 |
| 6,584,376 B1 | 6/2003 | Van Kommer | |
| 6,964,572 B2 * | 11/2005 | Cesa | A63H 11/00 |
| | | | 434/258 |
| 8,269,447 B2 | 9/2012 | Smoot et al. | |
| 8,571,781 B2 | 10/2013 | Bernstein et al. | |
| 8,751,063 B2 | 6/2014 | Bernstein et al. | |
| 8,910,734 B2 * | 12/2014 | Salter | A63B 43/00 |
| | | | 180/21 |
| 9,090,214 B2 | 7/2015 | Bernstein et al. | |
| 9,114,838 B2 | 8/2015 | Bernstein et al. | |
| 9,150,263 B2 | 10/2015 | Bernstein et al. | |
| 9,193,404 B2 | 11/2015 | Bernstein et al. | |
| 9,211,920 B1 | 12/2015 | Bernstein et al. | |
| 9,218,316 B2 | 12/2015 | Bernstein et al. | |
| 9,290,220 B2 | 3/2016 | Bernstein et al. | |
| 9,968,864 B2 * | 5/2018 | Clarke | A63H 33/005 |
| 2012/0168240 A1 | 7/2012 | Wilson et al. | |
| 2012/0173050 A1 | 7/2012 | Bernstein et al. | |
| 2014/0238762 A1 | 8/2014 | Berberian et al. | |
| 2015/0224941 A1 | 8/2015 | Bernstein et al. | |
| 2015/0245593 A1 * | 9/2015 | O'Mara | A01K 15/025 |
| | | | 446/457 |
| 2015/0362919 A1 | 12/2015 | Bernstein et al. | |
| 2015/0370257 A1 | 12/2015 | Bernstein et al. | |
| 2016/0004253 A1 | 1/2016 | Bernstein et al. | |
| 2016/0033967 A1 | 2/2016 | Bernstein et al. | |
| 2016/0054734 A1 | 2/2016 | Bernstein et al. | |
| 2016/0090133 A1 | 3/2016 | Bernstein et al. | |
| 2016/0101741 A1 | 4/2016 | Bernstein et al. | |
| 2016/0202696 A1 | 7/2016 | Bernstein et al. | |
| 2016/0316721 A1 * | 11/2016 | Xie | A01K 15/025 |

FOREIGN PATENT DOCUMENTS

| | | |
|---|---|---|
| CN | 105137861 A | 12/2015 |
| CN | 105264452 A | 1/2016 |
| CN | 205080395 U | 3/2016 |
| CN | 105774931 A | 7/2016 |
| DE | 202015002763 U1 | 5/2015 |
| DE | 212015000011 U1 | 12/2015 |
| FR | 2080853 A1 | 11/1971 |
| GB | 360137 * | 11/1931 |
| KR | 20160016830 A | 2/2016 |
| WO | 2012094349 A2 | 7/2012 |
| WO | 2014182730 A1 | 11/2014 |
| WO | 2016025047 A1 | 2/2016 |
| WO | 2016025617 A1 | 2/2016 |

OTHER PUBLICATIONS

Javadi, Amir Homayoun, et al.; "Introducing Glory: A Novel Strategy for an Omnidirectional Spherical Rolling Robot," Transactions of the ASME, vol. 126, pp. 678-683 Sep. 2004.

Mukherjee, Ranjan, et al; "Motion Planning Strategies for Spherobot: A Spherical Mobile Robot," Proceeding of the 38th Conference on Decision & Control, Phoenix, Arizona, pp. 2132-2137, Dec. 1999.

Alves, J., et al.; "Design and Control of a Spherical Mobile Robot," Proceedings of the Institution of Mechanical Engineers, vol. 217:Part I:J, Systems and Control Engineering, Jun. 2003.

Bicchi, Antonio, et al.; "Introducing the "Sphericle": An Experimental Testbed for Research and Teaching in Nonholonomy."

Liu, DaLiang, et al.; "Stabilization and Path Following of a Spherical Robot," Beijing University of Posts and Telecommunications, Beijing, China, IEEE 2008.

Halme, Aarne, er al.; "Motion Control of a Spherical Mobile Robot," Helsinki University of Technology, Automation Technology Laboratory, Finland, IEEE 1996.

Ylikorpi, Tomi, et al.; "Ball-Shaped Robots," Climbing & Walking Robots, Towards New Applications, Itech Education and Publishing, Vienna, AT, Oct. 2007.

Shu, Guanghui, et al.; "Motion Control of Spherical Robot Based on Conservation of Angular Momentum," International Conference on Mechatronics and Automation, IEEE 2009.

Li, Zexiang, et al.; "Motion of Two Rigid Bodies with Rolling Constraint," IEEE Transational on Robotics and Automation, vol. 6, No. 1, Feb. 1990.

Bernstein, Ian, et. al.; U.S. Appl. No. 62/149,441, Entitled: Self-Propelled Device With Magnetic Coupling, filed Apr. 17, 2015.

Berberian, Paul, et. al.; U.S. Appl. No. 61/553,923, Entitled: Self-Propelled Device and System and Method for Controlling Same, filed Oct. 31, 2011.

Berberian, Paul, et. al.; U.S. Appl. No. 61/430,083, Entitled: Method and System for Establishing 2-way Communication for Controlling a Robotic Device, filed Jan. 5, 2011.

Berberian, Paul, et. al.; U.S. Appl. No. 61/430,023, Entitled: Method and System for Controlling a Robotic Device, filed Jan. 5, 2011.

Schroll, Gregory C.; "Dynamic Model of a Spherical Robot From First Principles," Thesis for Department of Mechanical Engineering, Colorado State University, Summer 2010.

Xkcd; a Webcomic of Romance, Sarcasm, Math, and Language; "New Pet," https://xkcd.com/413/, printed Aug. 25, 2016, posted Apr. 2008.

Das, Tuhin Kumar; "Feedback Stabilization of the Rolling Sphere: An Intractable Nonholonomic System," A Dissertation Submitted to Michigan State University, Department of Mechanical Engineering, 2002.

Tomik, Filip; "Design Challenges in the Development of a Spherical Mobile Robot," A Thesis Submitted to Michigan State University, Department of Engineering, 2003.

Oumer, Nassir Workicho; "Development of Wireless Control System for a Spherical Robot," Thesis submitted to Helsinki University of Technology, Department of Automation and Systems Technology, Aug. 19, 2009.

U.S. Appl. No. 61/403,023 File History, Jan. 5, 2011 through Jan. 27, 2011.

U.S. Appl. No. 61/430,083 File History, Jan. 5, 2011 through Jan. 14, 2011.

U.S. Appl. No. 61/553,923 File History, Oct. 31, 2011 through Feb. 12, 2012.

Declaration of Dr. Jason Janet filed in Inter Partes Review IPR2017-01272 of U.S. Pat. No. 9,211,920 B1, Apr. 20, 2017.

Daliang Liu, Hanxv Sun, Qingxuan Jia, and Liangqing Wang, "Motion Control of a Spherical Mobile Robot by Feedback Linearization," Proceedings of the 7th World Congress on Intelligent Control and Automation 965 (2008).

Hashem Ghariblu and Hadi Mohammadi, "Structure and Dynamic Modeling of a Spherical Robot," 8th International Symposium on Mechatronics and its Applications (2012).

Xialing Lv and Minglu Zhang, "Robot Control Based on Voice Command," IEEE International Conference on Automation and Logistics 2490 (2008).

Qiang Zhan, Yao Cai, and Caixia Yan, "Design, Analysis and Experiments of an Omni-Directional Spherical Robot," IEEE International Conference on Robotics and Automation 4921 (2011).

Martyn Williams, "Sony unwraps high-tech 'healing' ball," CNN. com, published Mar. 28, 2002, http://edition.cnn.com/2002/Tech/ptech/03/28/robodex.healing.ball.idg/?related, retrieved on Apr. 4, 2017.

(56) References Cited

OTHER PUBLICATIONS

Randall Munroe, "New Pet," http://xkcd.com/413/, Retrieved from Internet Archive (http://web.archive.org/web/20080701080435/http://xkcd.com/413/) (2008), Retrieved on Apr. 13, 2017.
"How a Small Robotics Startup Helped Disney Bring BB-8 to Life," US Chamber of Commerce (https://www.uschamber.com/above-the-fold/how-small-robotics-startup-helped-disney-bring-bb-8-life), Retrieved on Mar. 31, 2017.
"Meet BB-8: The New Droid in the Lives of Star Wars Buffs," Wharton School of the University of Pennsylvania (Nov. 13, 2015) (http://knowledge.wharton.upenn.edu/article/meet-bb-8-the-new-droid-in-the-lives-of-star-wars-buffs/), Retrieved on Mar. 31, 2017.
Hiroyuki Fujita, "A Decade of MEMS and its Future," Proceedings IEEE the Tenth Annual International Workshop on Micro Electro Mechanical Systems (1997).
Gene F. Franklin, J. David Powell, Abbas Emami-Naeini, "Feedback Control of Dynamic Systems," Fourth Edition, Prentice Hall (2002).
Inter Partes Review Case No. IPR2017-01272 of U.S. Pat. No. 9,211,920 B1, Petition for Inter Partes Review, filed Apr. 20, 2017.

* cited by examiner

SPHERICAL MOBILE ROBOT WITH PIVOTING HEAD

BACKGROUND

1. Field

Embodiments of the invention relate to robotics. More specifically, embodiments of the invention relate to spherical mobile robots.

2. Related Art

Spherical robots of the prior art typically utilize a "hamster ball" design. In the "hamster ball" design, an inner rover moves within a spherical shell. The inner rover is independent and unconnected from the spherical ball. The "hamster ball" design may also include a static head disposed directly above the inner rover. The head is static because it does not move relative to the inner rover. In particular, the static head only moves with a corresponding movement of the inner rover. Consequently, the static head remains vertically above the inner rover.

SUMMARY

A first embodiment of the invention is directed to a mobile robot comprising a spheroid shell, an internal assembly, and a head. The internal assembly is disposed within the spheroid shell for propelling the mobile robot. The internal assembly includes a base, a flywheel assembly rotatably secured to the base, a drive assembly rotatably secured to the spheroid shell and configured to propel the mobile robot by rotating the spheroid shell about the base, and a pivoting arm with a magnetized end pivotably secured to the base. The head is secured to the magnetized end of the pivoting arm through the spheroid shell. The head is configured to move relative to the base by the pivoting of the pivoting arm.

A second embodiment of the invention is directed to a mobile robot comprising a spheroid shell and an internal assembly. The internal assembly is disposed within the spheroid shell and includes a base, a flywheel assembly rotatably secured to the base, and a drive assembly configured to propel the mobile robot, wherein the drive assembly is rotatably secured to the spheroid shell such that rotation of the drive assembly is imparted to the spheroid shell.

A third embodiment of the invention is directed to a mobile robot comprising a spheroid shell, an internal assembly, and a head. The internal assembly is disposed within the spheroid shell for propelling the mobile robot, including a base, a drive assembly, and a pivoting arm with a magnetized end pivotably secured to the base. The head is secured to the magnetized end of the pivoting arm through the spheroid shell and is configured to move relative to the base by the pivoting of the pivoting arm.

Additional embodiments of the invention may be directed to a method of controlling a mobile robot. Still other embodiments may be directed to a non-transitory computer readable medium having a computer program stored thereon, wherein the computer program instructs at least one processor to perform the steps of controlling the mobile robot. Still further embodiments are directed to a mobile robot system that comprises the mobile robot and a user remote control or user device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of embodiments of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 4 is an exploded view of the various components of the internal assembly of FIG. 3, wherein FIG. 4 is rotated 90 degrees clockwise from the view of FIG. 3;

Figure 1:
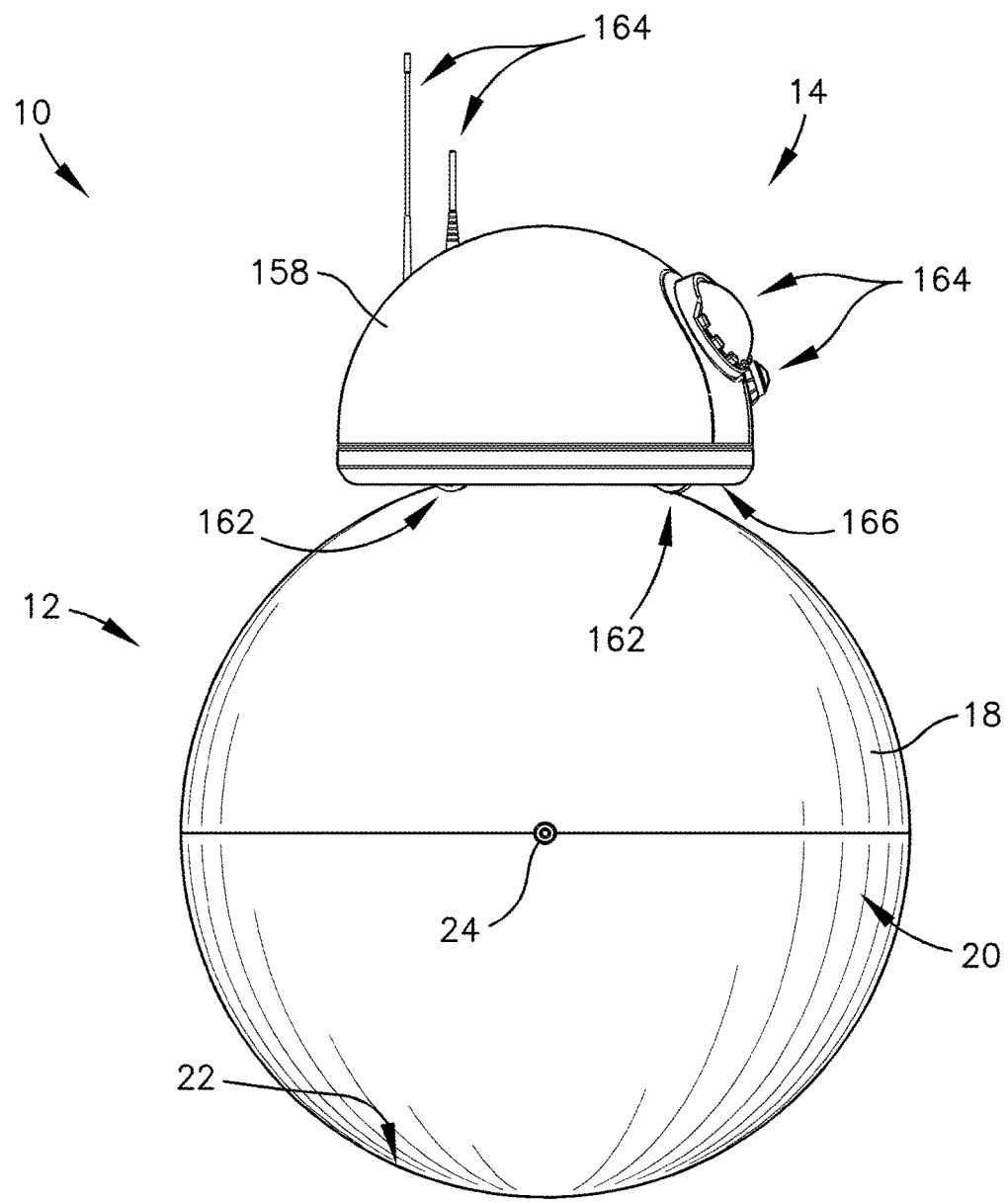
FIG. 1 is a side view of the mobile robot.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIG. 1, embodiments of the invention are directed to a mobile robot 10. The mobile robot 10 broadly comprises a spheroid shell 12, a head 14, and an internal assembly 16 (illustrated in FIG. 2). The spheroid shell 12 surrounds the internal assembly 16 and protects the internal assembly 16 from dust, debris, or other interfering components. The internal assembly 16 drives the spheroid shell 12 in a desired direction or path. The head 14 is disposed atop the spheroid shell 12 and moveably held in place by the internal assembly 16, as discussed below. The head 14 provides a stable and moveable platform for sensors, speakers, and other environmental interaction devices.

Figure 2:
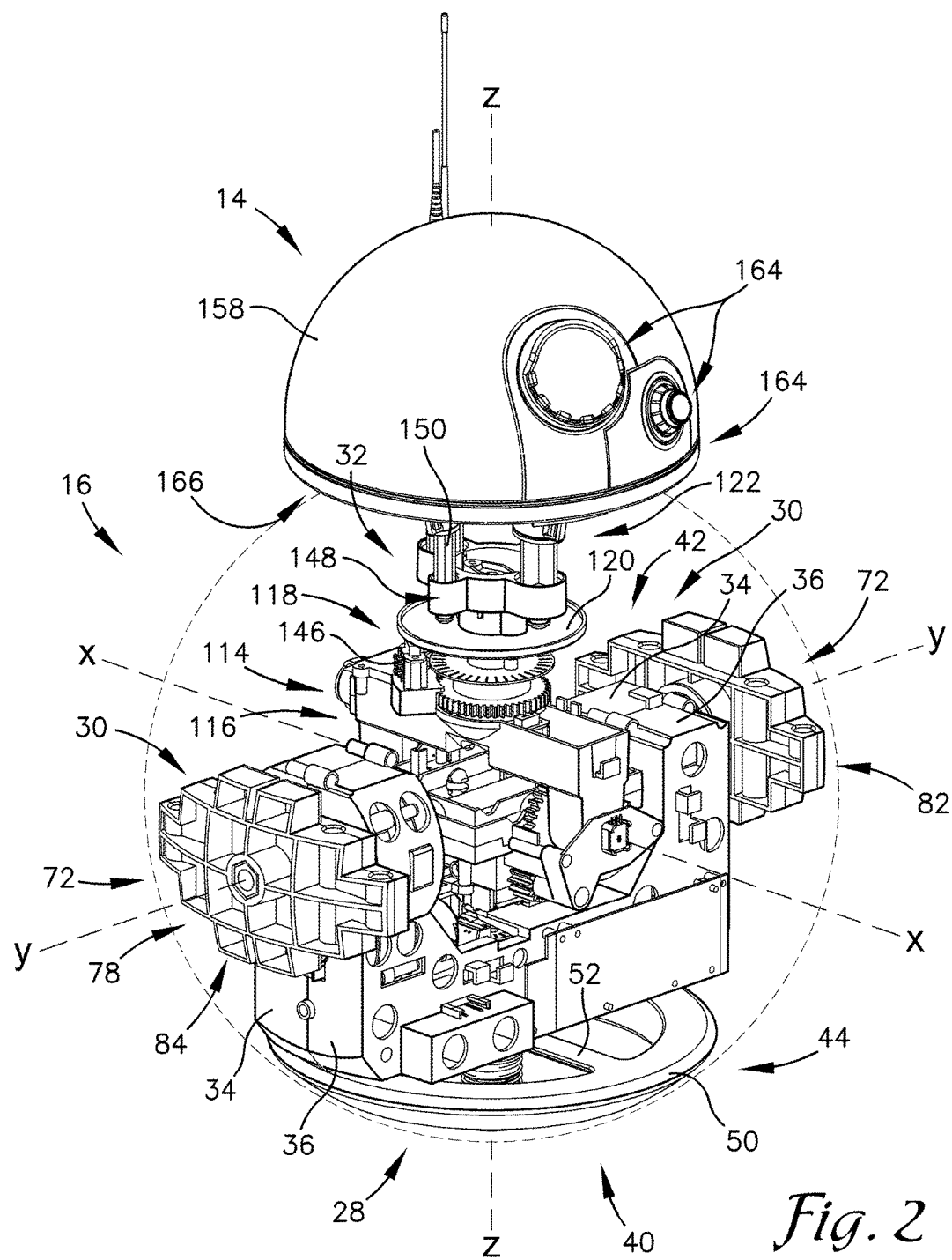
FIG. 2 is a perspective view of the mobile robot of FIG. 1 having a spheroid shell removed so as to show the internal assembly.
Figure 3:
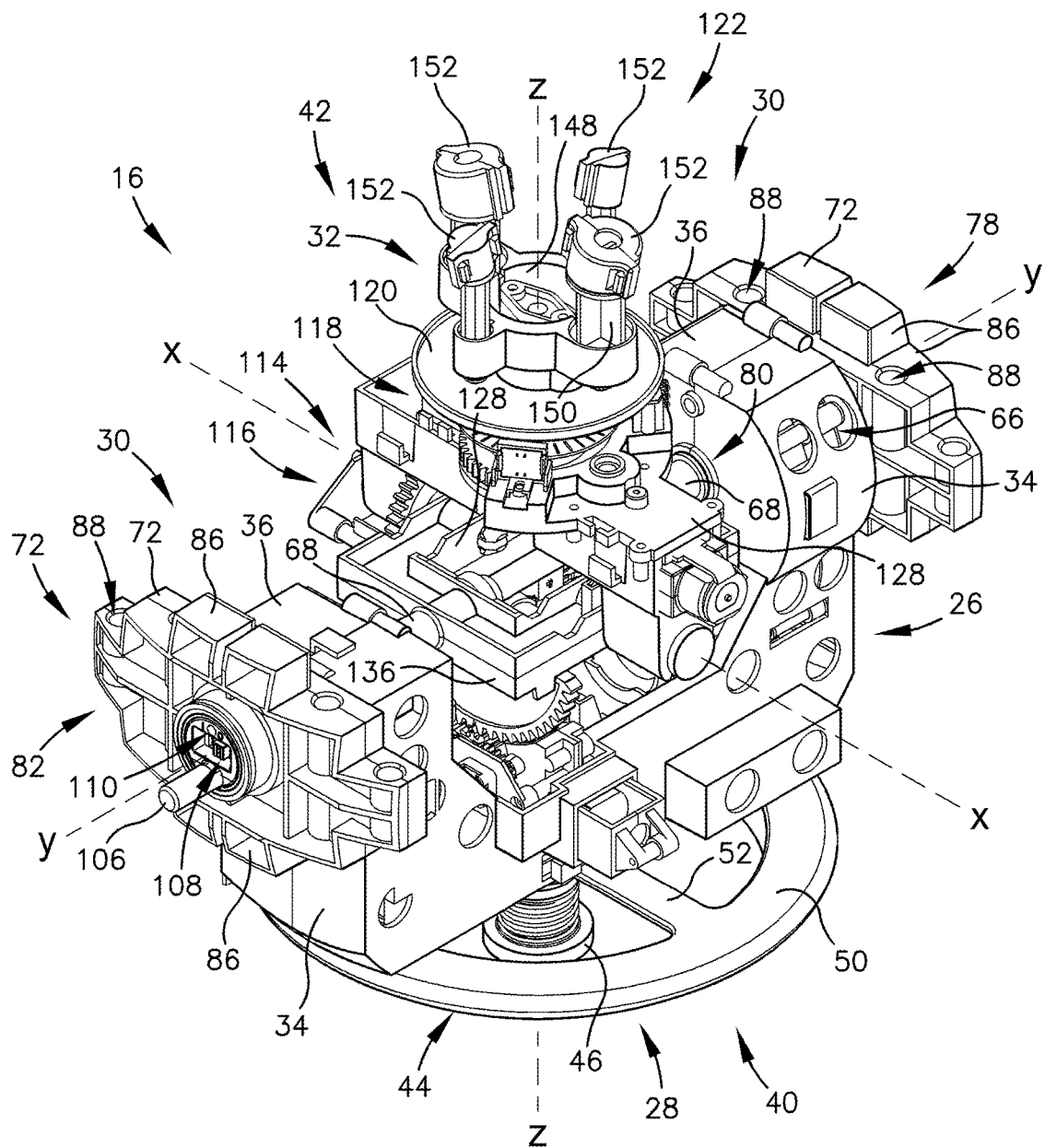
FIG. 3 is a perspective view of the internal assembly of the mobile robot of FIG. 2.
Figure 4:
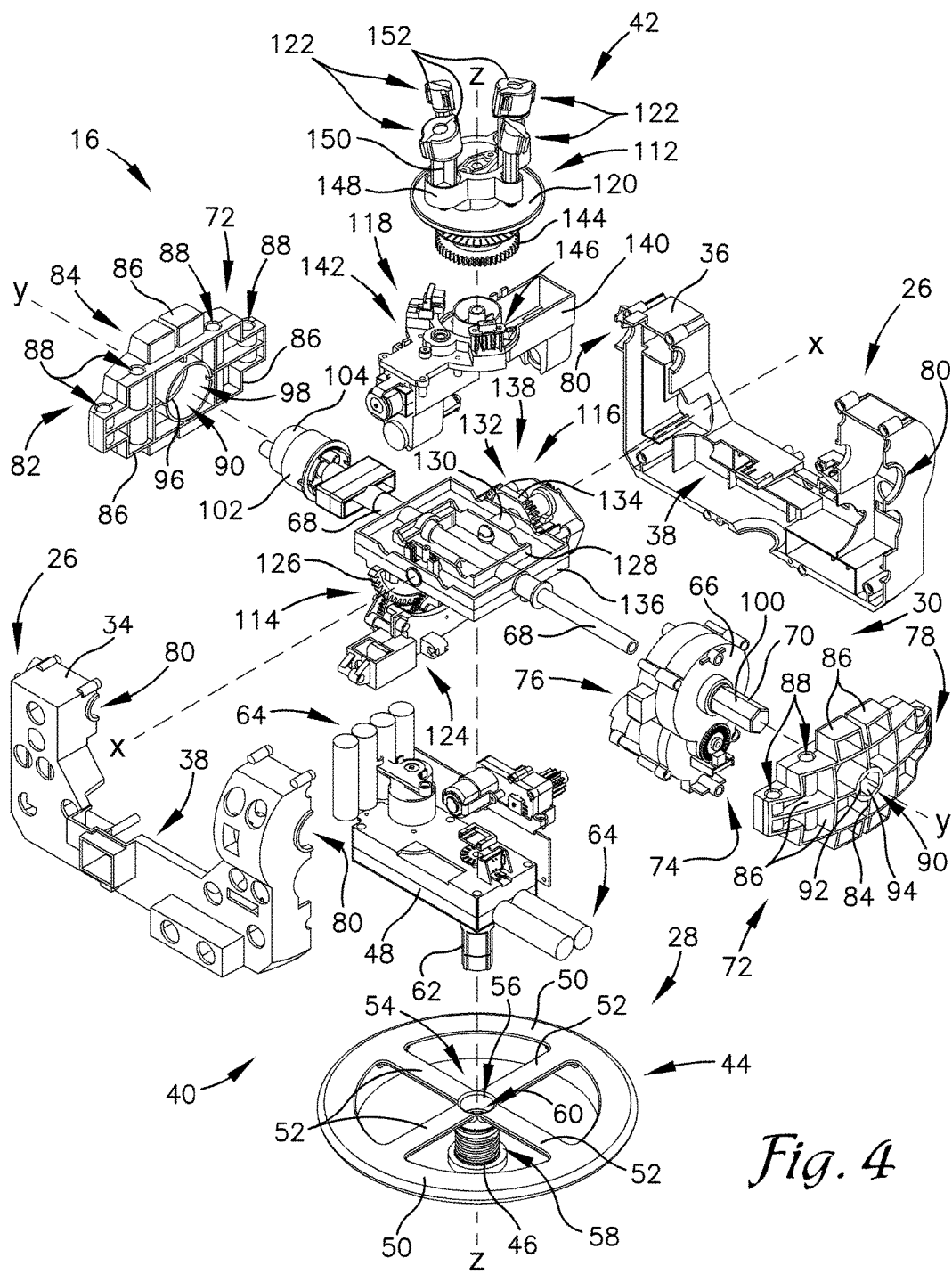

Before discussing the components of the mobile robot 10 in more detail, a reference frame system will be discussed to orient the reader. It should be appreciated that the reference frame is only exemplary and is utilized to simplify concepts. The reference frame is illustrated in FIGS. 2-4. The reference frame includes an x-axis, a y-axis, and a z-axis as illustrated. The axes are perpendicular to each other so as to form a traditional three-dimensional Cartesian coordinate system. The internal assembly 16 is configured to move the mobile robot 10 in the direction of the x-axis by rotating the spheroid shell 12 about the y-axis that is generally perpendicular to the x-axis. It should be appreciated that in embodiments of the invention, the spheroid shell 12 is generally fixed about the y-axis, and the internal assembly 16 is also generally fixed about the y-axis. The x-axis is therefore generally the direction of movement caused by the rotation about the y-axis. The z-axis is defined as perpendicular to both the x-axis and the y-axis and oriented generally upward. In embodiments of the invention, the origin of the Cartesian coordinate system is located in a geometric center of the spheroid shell 12.

In embodiments of the invention, the spheroid shell 12 provides exterior protection to the internal assembly 16. The spheroid shell 12 acts as a wheel for the internal assembly 16. The mobile robot 10 moves by rotating the spheroid shell 12 about the internal assembly 16. The spheroid shell 12 presents a spheroid wall 18. A spheroid (also known as an ellipsoid of revolution) is an ellipse rotated about a principle axis. A spheroid may be prolate (e.g., "elongated), oblate (e.g., "flattened"), or spherical. In some embodiments of the invention, the spheroid shell 12 is substantially spherical (as illustrated in FIG. 1). As the spheroid shell 12 only rotates about a fixed y-axis, in other embodiments of the invention the spheroid shell 12 is a substantial prolate or oblate spheroid. In these embodiments, the non-circular axis is aligned laterally (e.g., along the y-axis) so as to allow rotation of the circular axes to rotate about the y-axis.

An exterior surface 20 of the spheroid shell 12 is configured to interface with the ground. For example, the exterior surface 20 may be ruggedized for rolling along the ground, including tread, protrusions, channels, recesses, and/or the like. The exterior surface 20 rolls along the ground as the mobile robot 10 moves. An interior surface 22 is configured to be secured to the internal assembly 16. In embodiments of the invention, the spheroid shell 12 is rotatably fixed to the drive assembly 30 along the y-axis. The spheroid shell 12 is substantially hollow so as to allow the internal assembly 16 to be disposed therein. Unlike spherical robots of the prior art, in which independent wheels of an inner rover roll along an interior surface of the shell, most of the interior surface 22 of the spheroid shell 12 does not contact the internal assembly 16. Therefore, this allows for reinforcing structure (not shown) within the spheroid shell 12 if desired, such as for use of the mobile robot 10 on rough terrain, for larger spheroid shells, to support a shell made of a particular material (e.g., a lighter material), or the like.

In some embodiments of the invention, the spheroid shell 12 may include markings. The markings may be decorative, aesthetic, informational, functional, or the like. In some embodiments of the invention, the spheroid shell 12 may also include a port 24 so as to allow access to the interior of the spheroid shell 12. The port 24 may allow a user to access the interior of the spheroid shell 12 for repair and replacement of parts (such as batteries). The port 24 may also allow access to the exterior of the spheroid shell 12 for components of the internal assembly 16. For example, various components (not illustrated) of the internal assembly 16 may extend outwards, such as a stabilizing outrigger or an articulating arm with a tool or sensor disposed thereon.

The internal assembly 16 will now be discussed in greater detail, as illustrated in FIGS. 2-4. The internal assembly 16 is disposed within the spheroid shell 12 for propelling the mobile robot 10. In embodiments of the invention, the internal assembly 16 propels the mobile robot 10 in at least two directions. The two directions may include linearly along the x-axis and rotatably about the z-axis. By utilizing these at least two directions, movement in substantially all directions may be achieved. By utilizing these at least two directions simultaneously, turns and other maneuvers during movement can also be achieved. The internal assembly 16 may also keep itself substantially vertically aligned. The vertical alignment allows the internal assembly 16 to control the position, movement, and orientation of the head 14 relative to the internal assembly 16 and relative to the spheroid shell 12.

In embodiments of the invention (as best illustrated in FIG. 2 and FIG. 3), the internal assembly 16 includes a base 26, a flywheel assembly 28, a drive assembly 30, and a pivoting arm 32. The base 26 provides structural stability for and securement of the other components. The flywheel assembly 28 controls rotational movement about the z-axis and imparts this movement by inducing a counter-rotation of the spheroid shell 12 and the base 26. The drive assembly 30 controls lateral movement about the x-axis by driving the spheroid shell 12 around the base 26. The pivoting arm 32 controls movement of the head 14 relative to the base 26 and relative to the spheroid shell 12. The head 14 is magnetically secured to the pivoting arm 32, as discussed below.

In embodiments of the invention, the base 26 includes a first housing 34 and a second housing 36. The first housing 34 is secured to the second housing 36 and/or the other various components of the internal assembly 16. In some embodiments, the first housing 34 may be disposed opposite the second housing 36 along the x-axis, as illustrated in FIG. 4. The housing presents a void 38 into which the various components are disposed. In other embodiments, the base 26 may include a single housing or a plurality of housings may be utilized.

As best illustrated in FIG. 2 and FIG. 3, the flywheel assembly 28 is rotatably secured to the base 26. In embodiments of the invention, the flywheel assembly 28 is rotatably secured to a bottom side 40 of the base 26, as illustrated, that is opposite a top side 42 on which the pivoting arm 32 is disposed. The flywheel assembly 28 is configured to rotate about the z-axis so as to cause a counter rotation of the base 26 and the spheroid shell 12 about the z-axis. The flywheel assembly 28 also keeps the base 26 substantially vertically aligned with the z-axis by providing a downward force due to mass.

In embodiments of the invention, as best illustrated in FIG. 4, the flywheel assembly 28 comprises a flywheel 44, a flywheel fastener 46, and a flywheel motor 48. The flywheel 44 is generally disk or wheel shaped. In some embodiments, the flywheel 44 includes an annular segment 50 and at least one spoke 52 extending from a central hub 54. This configuration moves mass away from the central hub 54 while maintaining structural stability. As such, rotation of the flywheel 44 by the flywheel motor 48 is more efficient in rotating the mobile robot 10 about the z-axis. In other embodiments, the fly wheel includes a generally flattened disc (not illustrated) disposed around the central hub 54.

The central hub 54 of the flywheel 44 presents an opening 56 for receipt of the flywheel fastener 46 and/or the flywheel motor 48 therethrough. The flywheel fastener 46 secures the flywheel 44 to the flywheel motor 48. The flywheel fastener 46 may include a threaded segment 58 and an opening 60 for receiving a flywheel shaft 62 therein. The flywheel 44 may permanently secure the flywheel 44 to the flywheel motor 48 so as to transfer a rotation of the flywheel shaft 62 to a rotation of the flywheel 44.

The flywheel motor 48 includes the flywheel shaft 62 (which may include a pinion gear, not shown) and a power source 64. The flywheel shaft 62 rotates via the flywheel motor 48. The flywheel motor 48 rotates the flywheel shaft 62 (and by extension, the flywheel 44 and the mobile robot 10) in response to an instruction from a processor, as discussed below. The flywheel motor 48, as powered by the power source 64, spins the flywheel 44 a certain number of angular rotations (or fraction thereof) to achieve a desired orientation or rotation of the mobile robot 10. The flywheel motor 48 is also configured to rotate in either direction about the z-axis.

In embodiments of the invention, the flywheel 44 is formed of a dense metal or other dense material. The flywheel 44 is dense and heavy for any of at least three purposes. First, the dense flywheel 44 tends to keep the mobile robot 10 generally upright along the z-axis. This may be advantageous because it tends to keep the head 14 (being opposite the flywheel 44) away from the ground where it may become dislodged from the pivoting arm 32. Second, the heavy flywheel 44 may help to ensure that the mobile robot 10 travels forward in the x-axis direction upon the drive assembly 30 rotating. If the internal assembly 16 was substantially uniformly weighted about the y-axis, the spinning motion of the drive assembly 30 (as discussed below) would tend to rotate the internal assembly 16 within the spheroid shell 12 instead of propelling the spheroid shell 12 forward (or backward) in the x-axis direction. The third potential reason for the dense and heavy flywheel 44 (as opposed to simply a dense and heavy lower region of the base 26) is to assist in rotation about the z-axis. A dense and heavy flywheel 44 will impart a greater moment on the mobile robot 10 by rotating therein. In some embodiments, the flywheel 44 may be at least 25% of the total mass of the mobile robot 10, at least 50% of the total mass of the mobile robot 10, or at least 75% of the total mass of the mobile robot 10.

The drive assembly 30 is rotatably secured to the interior surface 22 of the spheroid shell 12. The drive assembly 30 is configured to propel the mobile robot 10 by rotating the spheroid shell 12 about the base 26 along the y-axis. The drive assembly 30 is fixed relative to the spheroid shell 12, such that the internal assembly 16 is not free and independent of the spheroid shell 12 (as is common in the "hamster ball" designs of the prior art). The drive assembly is best illustrated in FIG. 4.

In embodiments of the invention, the drive assembly 30 includes a drive motor 66, a drive axle 68, a drive shaft 70, and at least one drive-shell attachment bracket 72. The drive axle 68 and the drive shaft 70 are generally aligned with the y-axis, such that rotation of the spheroid shell 12 is imparted around the drive axle 68 and the drive shaft 70. The drive motor 66 rotates the drive shaft 70 and/or the drive axle 68. In embodiments of the invention, the drive motor 66 rotates the drive shaft 70 out of a first side 74 of the drive motor 66 and drives the drive axle 68 out of a second side 76 of the drive motor 66. The drive shaft 70 drives a first drive-shell attachment bracket 78 (that is secured to the interior surface 22 of the spheroid shell 12, as discussed below). The drive axle 68 traverses the base 26 (such as through a set of axle openings 80 in the housing) so as to drive a second drive-shell attachment bracket 82.

In some embodiments, the drive shaft 70 provides the primary rotational force and the drive axle 68 is free spinning. In these embodiments, the spheroid shell 12 is driven only by the drive shaft 70, and the drive axle 68 keeps the drive shaft 70 aligned along the y-axis. In other embodiments, the drive axle 68 is fixed to the drive shaft 70 (or other component of the drive motor 66) such that the drive axle 68 is also being driven. In these embodiments, the drive axle 68 transfers the driving force to the second drive-shell attachment bracket 82. In still other embodiments, the drive motor 66 is substantially aligned near the z-axis such that the drive axle 68 drives both drive-shell attachment brackets 72 (and there is no drive shaft 70 as illustrated in FIG. 4).

In embodiments of the invention, the drive-shell attachment bracket 72 is configured to be secured to the interior surface 22 of the spheroid shell 12. The drive-shell attachment bracket 72 includes a face 84, a support honeycomb 86, at least one fastener receptor 88, and a drive receptor 90. The face 84 presents a generally complementary shape to the interior surface 22 of the spheroid shell 12. For example, as illustrated in FIG. 4, the face 84 may be generally arcuate. The support honeycomb 86 provides structural support to the drive-shell attachment bracket 72. The at least one fastener receptor 88 is configured to receive a fastener (not illustrated) therethrough. The fastener is also disposed through a corresponding fastener receptor (not illustrated) in the interior surface 22 of the spheroid shell 12. In other embodiments of the invention, another fastening method is utilized, such as by welding or by a chemical adhesive.

In embodiments of the invention, best illustrated in FIG. 4, the drive receptor 90 is configured to receive the drive shaft 70 or the drive axle 68 therethrough. In some embodiments of the invention, a first drive receptor 92 associated with the first drive-shell attachment bracket 78 presents a hex opening 94, and a second drive receptor 96 associated with the second drive-shell attachment bracket 82 presents a notched circular opening 98, as illustrated in FIG. 4. The hex opening 94 presents a complementary shape to a hex protrusion 100 of the drive shaft 70. The notched circular opening 98 presents a complementary shape to a notched circular protrusion 102 of the drive axle 68. In other embodiments, other securing methods and structures may be utilized. For example, the drive axle 68 and drive shaft 70 may be secured to their respective drive-shaft interfaces by a mechanical fastener, a chemical adhesive, or welding or may be monolithic. It should be appreciated that in embodiments of the invention, there are no internal wheels that travel along the interior surface 22 of the spheroid shell 12.

In embodiments of the invention, the notched circular protrusion 102 of the drive axle 68 allows a fixed panel 104 to be disposed therein. The fixed panel 104 (as best illustrated in FIG. 3) extends at least partially through the port 24 through the spheroid shell 12 (as illustrated in FIG. 1). The fixed panel 104 allows the user to access the internal assembly 16 through the spheroid shell 12. The fixed panel 104 remains substantially aligned with the vertical z-axis as the drive axle 68 rotates therearound. The fixed panel 104 of the drive assembly 30 may include a charging port 106, a power switch 108, and a status indicator 110. The charging port 106 is configured to receive a charging cable (not illustrated) therein for charging the batteries and other components of the internal assembly 16. The power switch 108 allows the user to power on and power off the internal assembly 16 (and by extension the mobile robot 10). In some embodiments, the head 14 has a head power switch for the user to provide power to the head 14, a head charging port, and a head status indicator, not illustrated.

Figure 5:
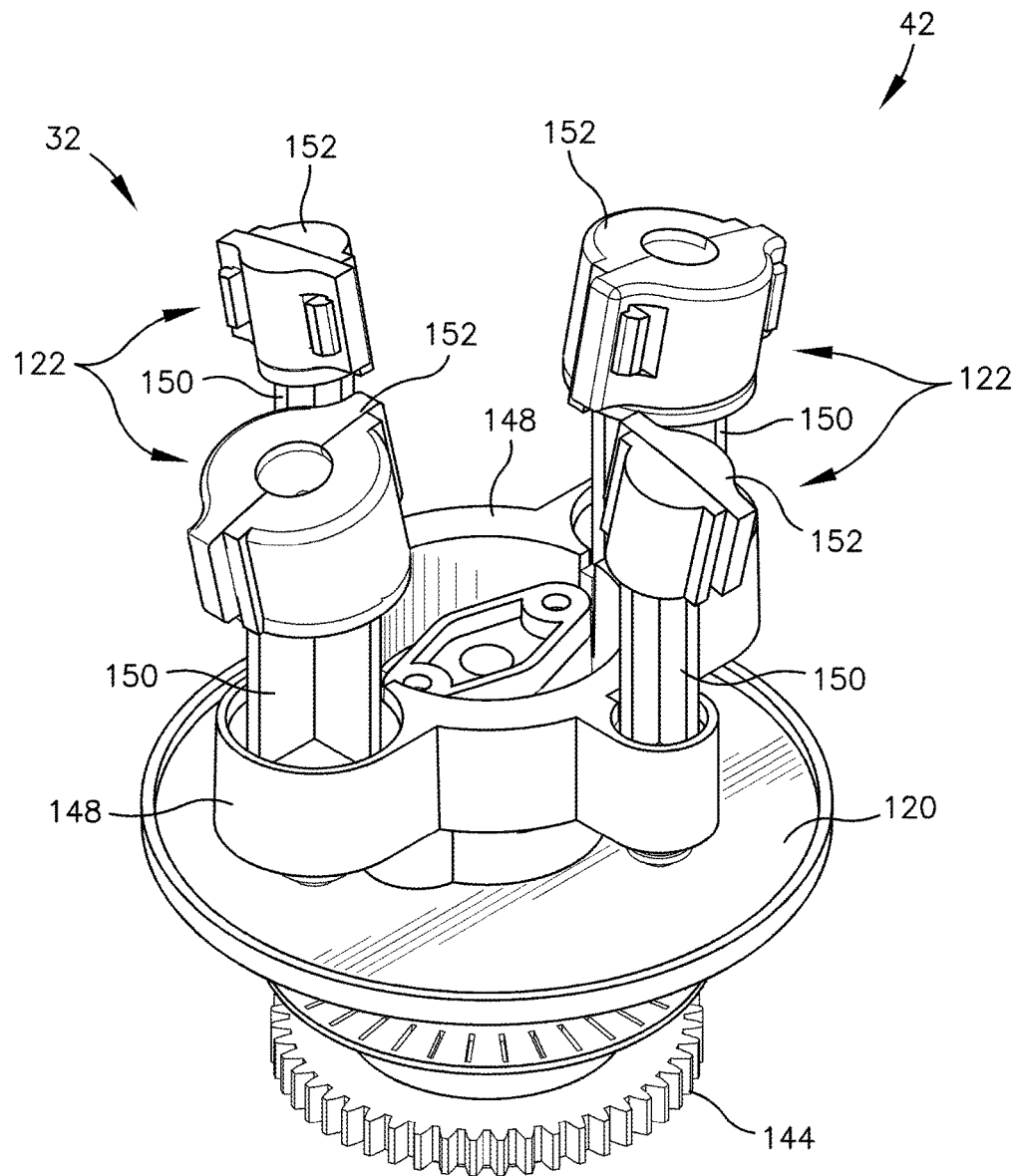
FIG. 5 is a perspective view of a pivoting arm of the internal assembly.

The pivoting arm 32 will now be discussed, as best illustrated in FIGS. 4 and 5. The pivoting arm 32 secures the head 14 to the spheroid shell 12 in a certain location and orientation. The certain location and orientation of the head 14 may be desired by the user and/or the processor for several reasons. For example, the head 14 location and orientation may be desired based upon directing a sensor in a certain direction (such as toward an obstacle or the user), relaying certain information to the user, performing certain actions, and the like. The head 14 may also be moved to a certain location and orientation to keep the mobile robot 10 balanced and/or moving in a certain direction. The pivoting arm 32 secures the head 14 by magnetic attraction, or another force, applied to the head 14. The pivoting arm 32 is pivotably secured to the base 26, such that a distal, magnetized end 112 of the pivoting arm 32 is configured to pivot relative to the base 26.

In some embodiments of the invention, the magnetized end 112 of the pivoting arm 32 is configured to move about the x-axis, the y-axis, and the z-axis. This may include moving about more than one axis simultaneously. As the magnetized end 112 of the pivoting arm 32 pivots, the pivoting arm 32 remains substantially adjacent to the interior surface 22 of the spheroid shell 12. This ensures that the magnetized end 112 remains at a substantially similar distance from the head 14 regardless of the location of the magnetized end 112 relative to the base 26. As such, the pivoting about the x-axis and about the y-axis may be substantially cross-axial such that they pass through the substantial geometric center of the spheroid shell 12. It should be appreciated that the drive axle 68 may also pass through the geometric center of the spheroid shell 12, as illustrated in FIG. 4.

In embodiments of the invention, the pivoting arm 32 includes an x-pivot device 114, a y-pivot device 116, a z-pivot device 118, a support plate 120, and a set of magnetic protrusions 122. Each of the x-pivot device 114, the y-pivot device 116, and the z-pivot device 118 is configured to rotate the magnetized end 112 about their respective axes. The x-pivot device 114, the y-pivot device 116, and the z-pivot device 118 are also configured to be utilized in concert with each other to achieve intermediate locations and orientations outside the x-axis and y-axis. The x-pivot device 114 and the y-pivot device 116 determine the location of the magnetized end 112 away from the true, vertical z-axis. The z-pivot device 118 determines the orientation of the magnetized end 112 at that location. It should be appreciated that in some embodiments, the x-pivot device 114, the y-pivot device 116, and the z-pivot device 118 pivot about a relative axis based upon the given position of the magnetized end 112. For example, the z-pivot device 118 may rotate the magnetized end 112 along a longitudinal axis. As such, the longitudinal axis may be referred to as a relative z-axis, as the longitudinal axis is aligned with the z-axis while the x-pivot device 114 and the y-pivot device 116 are both at a default, level position (as illustrated in FIG. 2 and FIG. 3).

The x-pivot device 114 and the y-pivot device 116 have a certain range of motion relative to the base 26. It should be appreciated that in embodiments of the invention, the magnetized end 112 of the pivoting arm 32 is prevented from traveling beyond the range of motion. For example, the range of motion may be at least 30 degrees, at least 60 degrees, at least 90 degrees, or at least 120 degrees. In embodiments, the z-pivot device 118 can rotate a full 360 degrees around, such that the magnetized end 112 may be disposed in any orientation along the longitudinal axis.

The x-pivot device 114 is configured to pivot the magnetized end 112 of the pivoting arm 32 about the x-axis relative to the base 26. In embodiments of the invention, the x-pivot device 114 comprises an x-pivot motor 124, an x-pivot gear 126, and an x-pivot bracket 128. The x-pivot motor 124 is powered by a battery or other power source 64 (such as the battery that powers the drive motor 66). The x-pivot motor 124 rotates the x-pivot gear 126 either directly or through a shaft. The x-pivot gear 126 rotates the x-pivot bracket 128. The x-pivot bracket 128 may include a connecting member 130 from the x-pivot gear 126 to the x-pivot bracket 128. As the x-pivot motor 124 turns in response to a powering or a command from a processor, the x-pivot gear 126 rotates the x-pivot bracket 128 a corresponding degree path (depending on the gear ratio). The pivoting x-pivot bracket 128 pivots the z-pivot device 118 and the magnetized end 112. By moving the magnetized end 112 about the x-axis, the x-pivot device 114 is further configured to move the head 14 generally in the y-axis direction along the outer surface of the spheroid shell 12, as the head 14 is magnetically secured to the magnetized end 112 of the pivoting arm 32.

The y-pivot device 116 is configured to pivot the magnetized end 112 of the pivoting arm 32 about the y-axis relative to the base 26. In embodiments of the invention, the y-pivot device 116 comprises a y-pivot motor 132, a y-pivot gear 134, and a y-pivot bracket 136. The y-pivot motor 132 is powered by a battery or other power source 64 (such as the battery that powers the drive motor 66). The y-pivot motor 132 rotates the y-pivot gear 134 either directly or through a shaft. The y-pivot gear 134 rotates the y-pivot bracket 136. The y-pivot bracket 136 may include a connecting member 130 from the y-pivot gear 134 to the y-pivot bracket 136. As the y-pivot motor 132 turns in response to a powering or a command from a processor, the y-pivot gear 134 rotates the y-pivot bracket 136 a corresponding degree path (depending on the gear ratio). The pivoting y-pivot bracket 136 pivots the z-pivot device 118 and the magnetized end 112. By moving the magnetized end 112 about the y-axis, the y-pivot device 116 is further configured to move the head 14 generally in the x-axis direction along the outer surface of the spheroid shell 12, as the head 14 is magnetically secured to the magnetized end 112 of the pivoting arm 32.

The x-pivot bracket 128 and the y-pivot bracket 136 provide a pivoting platform 138 for the z-pivot device 118 and the magnetized end 112 to be secured thereon. In embodiments of the invention, the x-pivot bracket 128 is substantially smaller than the y-pivot bracket 136 so as to fit within the y-pivot bracket 136. In other embodiments of the invention, the y-pivot bracket 136 is substantially smaller than the x-pivot bracket 128 so as to fit within the x-pivot bracket 128. This allows the x-pivot bracket 128 to move independently of the y-pivot bracket 136 while each remains aligned in the respective axis. In still other embodiments of the invention, the x-pivot device and the y-pivot device are formed of a single structure, such as a ball joint or a boom turret.

The z-pivot device 118 is configured to pivot the magnetized end 112 of the pivoting arm 32 about the z-axis relative to the base 26. The z-pivot device 118 is secured to either the x-pivot bracket 128 or the y-pivot bracket 136. As such, as the x-pivot bracket 128 and the y-pivot bracket 136 pivot, as described above, the z-pivot device 118 will pivot in a corresponding manner. In embodiments of the invention, the z-pivot device 118 includes a z-pivot base 140, a z-pivot motor 142, and a z-pivot gear 144. The z-pivot base 140 is secured to the x-pivot bracket 128 or the y-pivot bracket 136 so as to keep the z-pivot device 118 aligned with the desired orientation along the x-axis and the y-axis. The z-pivot motor 142 rotates the z-pivot gear 144 so as to rotate the magnetized end 112. The z-pivot device 118 is therefore configured to rotationally move the head 14 secured to the magnetized end 112 of the pivoting arm 32 along the longitudinal axis of the pivoting arm 32.

In other embodiments of the invention, the pivoting arm 32 includes the y-pivot device 116 and the z-pivot device 118 without the x-pivot device 114. As such, the pivoting arm 32 can move generally forward and rotate in the x-axis direction but not move in the y-axis direction. In these embodiments, the mobile robot 10 may rotate about the z-axis to align the y-pivot device 116 in the desired orientation. In still other embodiments, the pivoting arm 32 includes the x-pivot device 114 and the y-pivot device 116 without a z-pivot device 118. In these embodiments, rotation of the head 14 may be achieved by rotating the entire mobile robot 10.

The magnetized end 112 will now be discussed in greater detail, as best illustrated in FIG. 5. In embodiments of the invention, the magnetized end 112 includes a support plate 120, a set of magnetic protrusions 122, and a interlock switch 146. The magnetized end 112 may also include the z-pivot gear 144, as discussed above. The magnetized end 112 is configured to secure the head 14 in the desired location and orientation.

The support plate 120 is configured to be in a first position while the head 14 is magnetically secured to the pivoting arm 32 and configured to be in a second position while the head 14 is not magnetically secured to the pivoting arm 32. Typically, the first position will be upward along the longitudinal axis, and the second position will be downward along the longitudinal axis. While the head 14 is secured to the magnetized end 112, the support plate 120 will move upward to the first position based upon the magnetic attraction force of the head 14. Upon the head 14 falling off of the mobile robot 10 or being removed by the user, the support plate 120 will move to the second position, by the weight of an actuator (such as a spring) exerting a downward force on the support plate 120, by a magnetic force pulling the support plate 120 downward, or by another force.

The interlock switch 146, as illustrated in FIG. 4, is configured to detect whether the support plate 120 is in the first position or the second position. The interlock switch 146 detects the support plate 120 being in the second position by the support plate 120 (or a component thereof) striking, depressing, or otherwise providing input to the interlock switch 146. In various embodiments of the invention, the interlock switch 146 is an electromechanical switch (activated by a physical depression of the interlock switch 146), a capacitive switch (activated by detecting the capacitive variation based upon an adjacent metallic or conductive support plate 120), an infrared detector (activated by a reflected infrared signal), or other type of proximity detector or switch. A potentiometer or other encoder may be used to generate an electronic signal indicative of the support plate 120 being in the second position. Therefore, as the support plate 120 moves downward upon the head 14 dislodging from the magnetic attraction of the pivoting arm 32, the interlock switch 146 detects this condition.

In embodiments of the invention, the internal assembly 16 is configured to allow movement upon a detection that the support plate 120 is in the first position and configured to cease movement upon a detection that the support plate 120 is in the second position. This is because if the head 14 falls or is dislodged from the mobile robot 10, the mobile robot 10 will cease movement. Without the head 14, the mobile robot 10 may not be able to perform certain functions (such as detecting obstacles, receiving commands, and other functions as discussed below). The mobile robot 10 will also cease movement such that the user can find the head 14. The mobile robot 10 may also provide the user with an indication that the head 14 has fallen off, such as a certain animation (e.g., the spheroid shell 12 spinning left and right rapidly as though it is "looking" for its head 14) or an alarm emitted from the head 14, the internal assembly 16, and/or as delivered to a user device discussed below.

The set of magnetic protrusions 122 protrudes substantially upward (e.g., along the longitudinal axis) from the support plate 120, as best illustrated in FIG. 5. In embodiments of the invention, the set of magnetic protrusions 122 includes a protrusion base 148 and at least one protrusion. The protrusion base 148 is secured to the support plate 120 or the pivoting arm 32. Each of the protrusions extends from the protrusion base 148. In embodiments of the invention, each protrusion includes a post 150 and a cap 152. The cap 152 is secured at a distal end of the post 150 so as to be disposed adjacent or proximate to the interior surface 22 of the spheroid shell 12. In embodiments of the invention, the cap 152 presents a beveled or tilted top face. The top face presents a generally complementary shape to the interior surface 22 of the spheroid shell 12.

The head 14 includes at least one magnet for attracting a corresponding magnet or metallic component of the head 14, as discussed below. The magnet may be a permanent magnet (such as a magnetic metal, a magnetic composite, a rare-earth magnet, or the like), an electromagnet, or both. It should be appreciated that, as used herein, the "magnetized end" of the pivoting arm 32 may not be magnetic, but instead may be metallic so as to be attracted to a corresponding magnet in the head 14 (as discussed below). Therefore, in embodiments of the invention, the term "magnetized" may refer not to properties of the pivoting arm 32 but instead to properties that hold the head 14 to the pivoting arm 32.

In embodiments of the invention, the set of magnetic protrusions 122 includes at least one primary protrusion 154 and at least one secondary protrusion 156. The set of primary protrusions 154 may be distinct from the set of secondary protrusions 156 based upon size, polarity of the magnets, orientation of the magnets, or other distinguishing characteristics. In embodiments of the invention, the set of primary protrusions 154 includes two protrusions disposed opposite each other, and the set of secondary protrusions 156 includes two protrusions disposed opposite each other. In embodiments of the invention best illustrated in FIG. 5, the set of primary protrusions 154 is larger than the set of secondary protrusions 156. This orients the head 14 correctly as to the pivoting arm 32. For example, in embodiments of the invention, the mobile robot 10 is directionally indifferent such that the drive motor 66 can operate in a forward direction and a backward direction substantially similarly. In this embodiment, the magnetized end 112 of the pivoting arm 32 will attract the head 14 in two possible orientations that are separated by 180 degrees. Whichever direction the user places the head 14 on will dictate the primary direction of movement (in embodiments in which the head 14 includes a primary operating direction).

Figure 6:
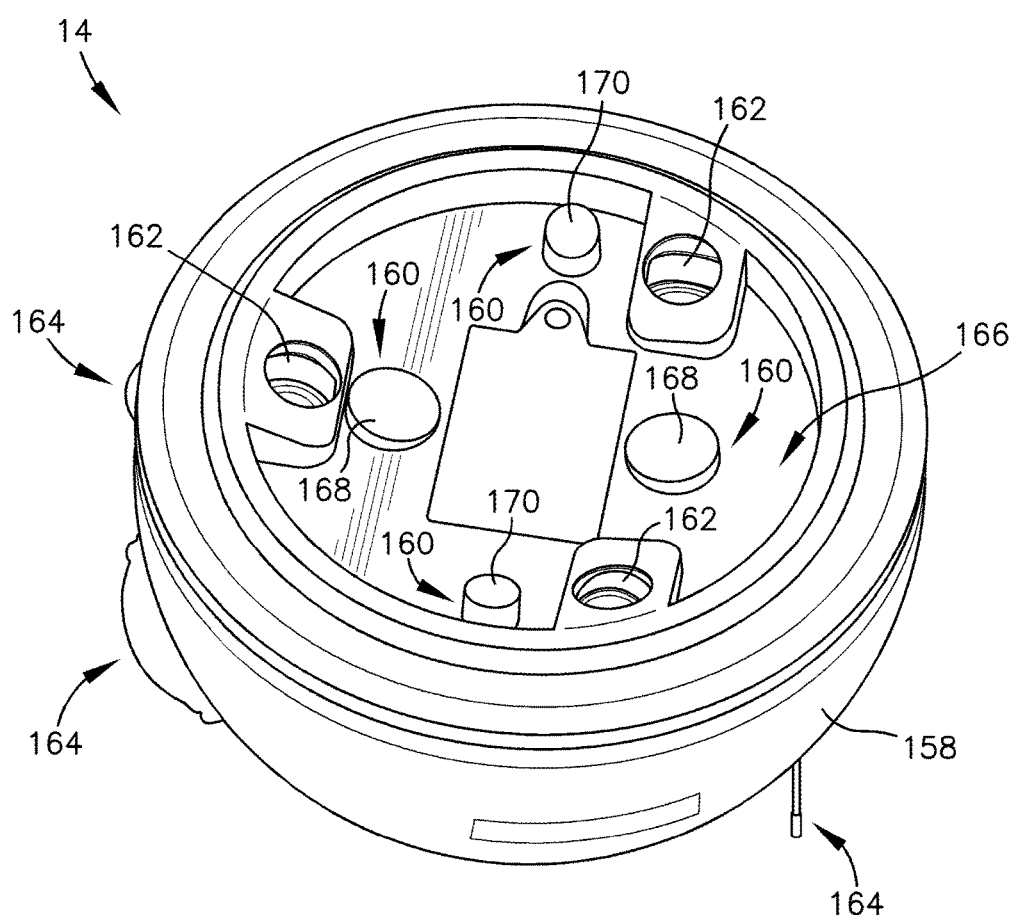
FIG. 6 is a perspective view of a head of the mobile robot as viewed generally from a bottom side.

The head 14 of the mobile robot 10 will now be discussed in more detail, as best illustrated in FIGS. 1, 2, and 6. The head 14 is secured to the magnetized end 112 of the pivoting arm 32 through the spheroid shell 12. The head 14 therefore travels along the exterior surface 20 of the spheroid shell 12, so as to move relative to the spheroid shell 12 and relative to the base 26 by the pivoting of the pivoting arm 32. As the spheroid shell 12 is rotating during movement, the head 14 provides a stable platform for detecting the environment, receiving commands, and performing other functions. In other embodiments, the mobile robot 10 does not include a head 14. In some of these embodiments, the spheroid shell 12 is transparent, translucent, or otherwise transmissive such that sensors and other functions may be performed by the internal assembly 16. In other of these embodiments, the spheroid shell 12 may include ports 24 along the y-axis so as to allow for the discussed functions to be performed along the y-axis (such as the fixed panel 104).

In embodiments of the invention, as best illustrated in FIG. 6, the head 14 includes a head housing 158, a set of magnetic receptors 160, a set of wheels 162, and at least one sensor 164 (discussed in depth below). The head housing 158 presents an interfacing side 166 configured to be magnetically secured against the spheroid shell 12. The interfacing side 166 may present a generally complementary shape to the spheroid shell 12. In some embodiments, the head housing 158 presents a general hemispherical shape so as to present an arcuate wall opposite the interfacing side 166. In other embodiments, the head housing 158 may present another shape, such as a pyramid shape, a rectangular prism, or other three-dimensional shape.

The set of magnetic receptors 160 is disposed on the interfacing side 166 and configured to magnetically secure to the magnetized end 112 of the pivoting arm 32. In embodiments of the invention, the set of magnetic receptors 160 presents a similar pattern to the set of magnetic protrusions 122 of the pivoting arm 32. In these embodiments, the set of magnetic receptors 160 is disposed in a first orientation and the magnetized end 112 is disposed in a corresponding first orientation such that the set of magnetic receptors 160 remains aligned with the magnetized end 112 of the pivoting arm 32. The set of magnetic receptors 160 may include a set of primary receptors 168 and a set of secondary receptors 170 that correspond with the set of primary protrusions 154 and the set of secondary protrusions 156, respectively.

The set of wheels 162 is disposed on the interfacing side 166 and configured to allow for traveling in the x-axis direction along the spheroid shell 12, as best illustrated in FIG. 1. In embodiments of the invention, the set of wheels 162 is the only component of the head 14 to contact the spheroid shell 12. The set of wheels facilitates the spinning of the spheroid shell 12 relative to the head 14 while the drive assembly 30 is propelling the mobile robot 10 forward. The set of wheels 162 reduces the friction generated between the head 14 and the spheroid shell 12. The set of wheels 162 also allows the spheroid shell 12 to pass under the set of wheels 162 when the head 14 is moving relative to the spheroid shell 12 in a direction other than the x-axis direction. For example, when the pivoting arm 32 is moving in the y-axis direction, the wheels 162 may slide across the exterior surface 20 of the spheroid shell 12. In embodiments of the invention, the wheels 162 are formed of a hardened polymer or other energy absorbing material.

Figure 7:
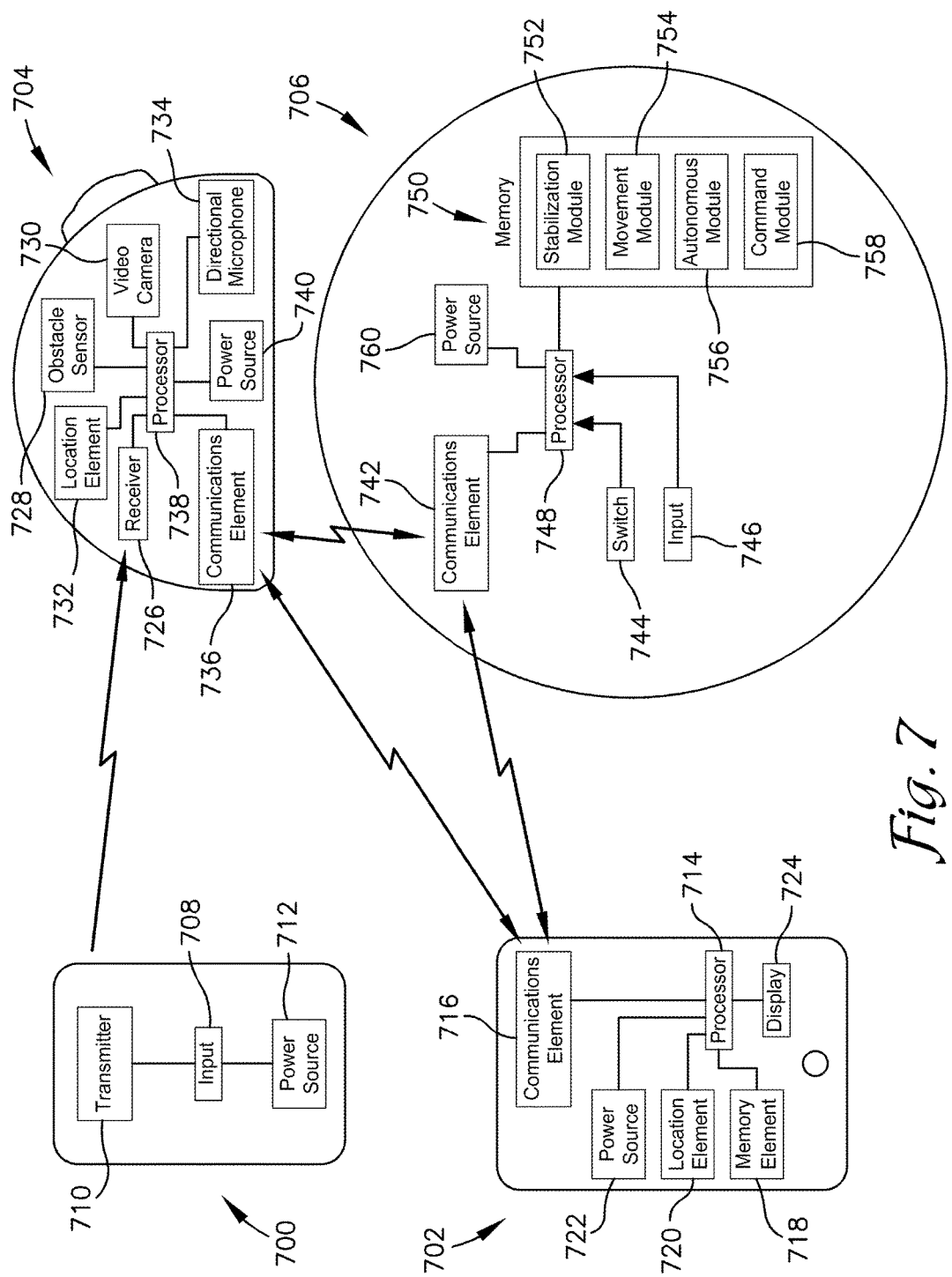
FIG. 7 is a schematic view of the various computing components of the mobile robot, including a user remote control and a user device.

Turning to FIG. 7, the various electronic components of the mobile robot 10 and accessories are illustrated schematically. It should be appreciated that, like other figures, FIG. 7 is an exemplary illustration of one embodiment of the invention. Other embodiments may include other layouts, devices, and functions. Further, the described functions and features may be performed by other components than as described below.

The mobile robot 10 of embodiments of the invention may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, displays, and/or communication busses for communicating with the various devices of the mobile robot 10.

In embodiments of the invention, the mobile robot 10 of embodiments of the invention includes a user remote control 700, a user device 702, a head electronic control unit 704, and an internal assembly electronic control unit 706. In other embodiments, the mobile robot 10 includes the user remote control 700, the head electronic control unit 704, and the internal assembly electronic control unit 706 without a user device 702. In still other embodiments, the mobile robot 10 includes the user device 702, the head electronic control unit 704, and the internal assembly electronic control unit 706 without the user remote control 700. It should be appreciated that "user remote control" and "user device" may be used interchangeably in the present description, and that functions described to the user device 702 may alternatively or additionally be performed by the user remote control 700, and vice versa. The description of the user remote control 700 and the user device 702 are therefore exemplary of two possible devices utilized for controlling the mobile robot. In yet further embodiments, the mobile robot 10 is controlled without any user device 702 or user remote control 700 (such as through the use of voice commands and visual recognition).

The user remote control 700 may be dedicated and exclusive to the mobile robot 10, or may be a standard remote control 700 that is operable to interface with or send commands to the mobile robot 10. The user remote control 700 will typically include an input 708, a transmitter 710, and a power source 712. The input 708 can include various input devices operable to send commands to the mobile robot 10. For example, the input 708 may include a joystick, a button, a knob, a wheel, a directional pad, or other electromechanical input. The user selects, presses, actuates, or otherwise provides the input 708 so as to provide a command or other message to the mobile robot 10. For example, the user may actuate a joystick "forward" to command the mobile robot 10 to travel forward in the x-axis direction. The user may also actuate the joystick "right" to command the mobile robot 10 to rotate about the z-axis in a corresponding direction. The user may also actuate the joystick "forward" and "right" to command the mobile robot 10 to simultaneously travel forward in the x-axis direction and rotate about the z-axis such that the mobile robot 10 turns while traveling. As another example, the user may actuate a button to have the mobile robot 10 perform a certain action, such as a "follow me" mode (discussed below), an autonomous mode, move the head 14 and/or spheroid shell 12 in a certain pre-defined pattern, or other action or modes.

The user remote control 700 communicates with the mobile robot 10 via a transmitter 710. The transmitter 710 sends an electronic signal that is received and interpreted by the mobile robot 10 (as discussed below). In some embodiments of the invention, the transmitter 710 is an infrared ("IR") transmitter. In other embodiments, the transmitter 710 utilizes another wireless communication method or protocol, such as Bluetooth, Wi-Fi, radio waves, or the like. The input 708 and/or the transmitter 710 are powered by the power source 712, such as a battery.

The user device 702 may be a smartphone, tablet computer, laptop computer, or other computing device. Typically, the user device 702 is multi-functional, such that the user device 702 performs tasks in addition to control and interaction with the mobile robot 10. The user device 702 may include a processor 714, a communications element 716, a memory element 718, a location element 720, a power source 722, and a display 724. The processor 714 may perform functions as instructed by a computer program stored in the memory element 718. The performed functions may include displaying of a graphical user interface ("GUI") on the display 724 to the user. The performed functions may also include receiving and analyzing user input (such as via the display 724 or other button, knobs, switches, or the like associated with the display 724). For example, the user may be presented with an option to draw a desired path on the display 724 of the user device 702. The processor 714 may then calculate specific movement instructions and send those instructions to the mobile robot 10 via the communications element 716.

The performed function may also include the sending of instructions, alerts, requests, or other messages to the mobile robot 10 via the communications element 716. The performed functions may also include the determining of a geographic location of the user device 702, such as via a GPS associated with the user device 702. This geographic information may be communicated to the mobile robot 10, such as to instruct the mobile robot 10 to move to that location. In some embodiments, the user device 702 may also include a transmitter (not illustrated) such as an IR transmitter for delivering instructions or other messages to the mobile robot 10.

The head electronic control unit 704 contains numerous electronic components for detecting and interacting with the environment. As the internal assembly 16 is encased in the spheroid shell 12, the head 14 allows the mobile robot 10 to have an unobstructed platform for observations of and interactions with the environment. For example, the head 14 may detect obstacles, receive voice commands, receive electronic commands, present audio feedback, and perform other tasks. The head 14 may also be moved during mobile operations to assist in performing various maneuvers. The head 14 may include various sensors 164 disposed in the arcuate wall for detecting a condition, such as an obstacle in proximity to the mobile robot 10, a voice command from a user, and a digital command from a user device 702.

In embodiments of the invention, the head electronic control unit 704 includes a receiver 726, an obstacle sensor 728, a video camera 730, a location element 732, a directional microphone 734, a communications element 736, a processor 738, and a power source 740. The head electronic control unit 704 may also include other components, such as lights and speakers. The receiver 726 is configured to receive instructions and other electronic messages from the user remote control 700, the user device 702, and/or other electronic devices. For example, the mobile robot 10 may include a base station (not illustrated) that emits an IR signal such that the mobile robot 10 can move to the base station as desired for recharging and other functions. It should also be appreciated that the receiver 726 may instead utilize another signal or protocol, as discussed below. The receiver 726 may include a set of IR receivers disposed around a perimeter of the head 14. As such, the head 14 may be configured to receive instructions from multiple different relative directions and determine a direction from which the instruction was received. For example, the head 14 may have five IR receivers equally spaced around the head 14.

In embodiments of the invention, the head 14 will include the set of obstacle sensors 728 disposed around the head 14 for detecting obstacles in multiple directions. The obstacle sensor 728 is configured to emit a signal and receive a reflected signal from an obstacle. The emitted signal may be a radar signal, an infrared signal, a sonar signal, an energized beam, or other electromagnetic or physical signal. Typically, each obstacle sensor 728 will be oriented relative to the mobile robot 10 outward in a certain range or field. The obstacle sensor 728 can therefore emit signals and receive reflected signals along a field that fans out from the obstacle sensor 728. The set of obstacle sensors 728 therefore forms an overlapping coverage around at least a portion of a perimeter of the mobile robot 10. Signals reflected by the set of obstacle sensors 728 are analyzed to detect distance and direction to the obstacle. The lack of a returned signal may also be indicative of an obstacle, such as a steep drop, cliff, or recess. The mobile robot 10 may then utilize this information to avoid the obstacle.

The video camera 730 may be utilized to detect the environment. For example, the video camera 730 may be utilized to recognize a certain user, a certain user remote control 700, or perform other recognition functions. The video camera 730 may also be utilized additionally or alternatively to the set of obstacle sensors 728 to determine nearby obstacles such that they can be avoided. The video camera 730 may also record and/or stream video data to the user device 702 or other electronic resource. The recorded and/or streamed video data may include metadata indicative of the actions, location, status, or other information about the mobile robot 10. Metadata associates one set of data with another set of data. The metadata may be embedded in the captured video data, stored externally in a separate file that is associated with the captured video data, otherwise associated with the captured video data, or all of the above. Externally stored metadata may also have advantages, such as ease of searching and indexing. The metadata may also be stored in a human readable format, such that a user can access, understand, and edit the metadata without any special software.

Embodiments of the mobile robot 10 further comprise the location element 732, such as a GPS receiver. The location element 732 determines and records the GPS location of the mobile robot 10 during the various actions, and may be utilized to assist the mobile robot 10 in moving to a certain geographic location. The location element 732 transmits information indicative of the location to the processing element. The location information may then be stored on the mobile robot 10 and/or be transmitted to the user device 702 via the communications element 736. The location element 732 may also determine and record the time associated with the various actions.

The directional microphone 734 allows for the receipt and analysis of voice commands. In embodiments of the invention, the directional microphone 734 includes a set of microphones disposed around the perimeter of the head 14. The strength or volume of the received voice command may be analyzed to determine a most likely direction to the user. For example, upon the reception of a voice command, the head 14 of the mobile robot 10 may turn to the perceived direction. This may indicate to the user that the mobile robot 10 heard and understood the command. This may also indicate to the user that the mobile robot 10 is ready for additional commands. Further, rotating the head 14 to the direction of the perceived voice command may allow the video camera 730 or other sensor to confirm the identity of the user (via facial recognition, user remote control 700 recognition, or the like). In embodiments of the invention, the set of microphones includes three microphones spaced approximately 120 degrees from one another around the perimeter of the head 14. Based upon the strength of the voice as detected by each microphone, an approximated direction of origin may be calculated (such as within 45 degrees of the true user's direction). The head 14 may then turn to the approximated direction (as discussed below). The directional microphone 734 may also include a voice recognition microphone for detecting the content of the voice command.

The head communications element 736 is communicatively coupled with the user device 702, the user remote control 700, and a communications element 742 of the internal assembly 16. The head communications element 736 is configured to send a condition indication to the internal communications element 742 based upon said detected condition by the sensor, as discussed above. In embodiments of the invention, the head communications element 736 will send sensor data, received commands, and other messages to the internal communications element 742. The internal components (discussed below) will then determine and implement actions based upon the received information. In other embodiments of the invention, the head communications element 736 will send determined movement commands (as determined by the head processor 738) to the internal communications element 742. In embodiments of the invention, the head communications element 736 is wirelessly communicatively coupled to the internal communications element 742. In other embodiments, the head communications assembly transmits signals directly through the spheroid shell 12 to the internal communications element 742.

For example, the head communications element 736 may transmit information indicative of the obstacle to the internal communications element 742 and the user device 702. The mobile robot 10 then may take steps to avoid the obstacle while information indicative of the obstacle is displayed or otherwise alerted to the user. Either or both of the head communications element 736 or the internal communications element 742 is communicatively linked to the user device 702, such that messages can be sent therebetween. In some embodiments, either or both of the head communications element 736 or the internal communications element 742 is also communicatively coupled, either directly or indirectly, with one or more other elements of the system. The mobile robot 10 may transmit information indicative of a status. The status could include information such as mobile robot 10 power on, action start time, action stop time, current action, action successful completion, error detected, error not detected, location of the mobile robot 10 (for mobile robots 10 equipped with a location element 732), known user information (based upon a proximity tag identifier, a connected mobile application, facial recognition, or the like), one or more identifiers (such as model number or serial number) associated with mobile robot 10, etc. All or some of this information can be stored as metadata for the sensor data, or displayed in real time by one or more displays associated with the system (such as on the user device 702).

In embodiments of the invention, the internal assembly electronic control unit 706 may include the communications element 742, a switch 744, an input 746, a processor 748, a memory 750 (which may include a stabilization module 752, a movement module 754, an autonomous module 756, and a command module 758), and a power source 760 (which may include power source 64 illustrated in FIG. 4). The internal assembly electronic control unit 706 determines commands for the various motors and components described above. Upon the receipt of a certain command or status, the internal assembly electronic control unit 706 may determine specific motor actions that will achieve a desired state and send commands or power to the motors to perform the desired actions.

The switch 744 may be utilized by the user to provide power to the mobile robot 10 (or more specifically, to the internal assembly 16 of the mobile robot 10). The switch 744 may be disposed on the fixed panel 104 as discussed above. The input 746 acquires user input directly on the mobile robot 10. For example, the input 746 could include a communications port (which may be the same as or adjacent to the charging port 106 discussed above) for the receipt of electronic commands therein. The input 746 may additionally or alternatively include buttons, knobs, switches, etc. for the transfer of information by the user. The user input 746 could include a system check button, a start action button, a stop action button, a reset button, a display toggle button, etc.

The processor 748 performs various steps as instructed by a computer program stored on the memory 750. The memory 750 is a non-transitory computer readable medium having at least one computer program stored thereon. In embodiments, of the invention, the computer program may include the stabilization module 752, the movement module 754, the autonomous module 756, and the command module 758.

The stabilization mode keeps the mobile robot 10 stable and level. Typically, the stabilization module 752 will be utilized in the background or simultaneously with other modules discussed below. The stabilization module 752 may determine, based upon the current conditions of the mobile robot 10, a likelihood of tipping or other undesired state. This may be determined based upon a current attitude of the mobile robot 10 (based upon the readings of a set of gyroscopes, not illustrated), the current direction and speed of travel, any detected obstacle, a planned path or trajectory, current stresses and strains emplaced on various components of the internal assembly 16 (based upon the readings of a strain gauge, not illustrated), a strength of the magnetic attraction between the pivoting arm 32 and the head 14 (as detected by a magnetic sensor associated with the pivoting arm 32, not illustrated), and other considerations.

The stabilization module 752 may also calculate the maximum safe movement parameters for the conditions. For example, the stabilization module 752 may determine that the mobile robot 10 may only turn at a certain rate given its current forward speed. The stabilization module 752 may then instruct the drive assembly 30 to slow the mobile robot 10 such that the turn can be achieved, and/or may reduce the severity of the turn. Similarly, if an obstacle is detected in the path of the moving mobile robot 10, the stabilization module 752 may cease movement so as to prevent the mobile robot 10 from striking the obstacle. As yet another example, the stabilization module 752 may cease operations upon available power falling below a certain threshold, upon the motor stalling, upon the detection of an error, or the like. The stabilization module 752 is therefore a background function such that it monitors the actions of the mobile robot 10 to determine whether a potentially unsafe or unstable condition is being utilized or is likely. The stabilization module 752 may then send information indicative of the unsafe or unstable condition such that mitigating actions may be taken to prevent damage.

The movement module 754 determines the specific motors to operate and the degree and duration of the operation so as to achieve a desired movement. For example, upon the detection of a voice command (as discussed above), the movement module 754 may provide a command to the z-pivot device 118 to rotate the head 14 a certain angular range, so as to orient the head 14 toward the user. As another example, upon the user actuating the joystick input 708 of the user remote control 700 forward, the movement module 754 will instruct the drive motor 66 to turn in the forward direction for the duration that the signal indicative of the joystick input 708 is being received.

The autonomous module 756 performs various actions as determined by the processor 748. In embodiments of the invention, the autonomous module 756 is enabled by a selection of an input 708,746 by the user. In the autonomous module 756, the processor 748 determines appropriate actions and takes these actions without direct and explicit instructions from the user. Outside of autonomous mode, the mobile robot 10 may await explicit and clear instructions from the user (such as a manipulation of the joystick input 708) before performing tasks.

For example, in embodiments of the invention the autonomous mode may include a "follow me" mode. The user may begin the "follow me" mode by selecting an option in the user device 702, or by pressing or selecting a switch input 708 on the user remote control 700. In the "follow me" mode, the mobile robot 10 detects the IR signal from the user device 702 or user remote control 700. The mobile robot 10 will then move generally toward the IR signal until a certain signal strength is achieved. The mobile robot 10 will then continue to move such that the desired signal strength is maintained. The desired signal strength is such that the mobile robot 10 is near enough to the user to follow the user, but not too close to the user so as to strike the user during movement. The autonomous mode determines the appropriate motor commands based upon the signal strength and direction as detected by the head 14 and communicated to the communications element 742 of the internal assembly 16.

As another example, in embodiments of the invention, the autonomous mode may include an "explore" mode. Upon a selection of the explore mode, the mobile robot 10 will move around and explore the environment in the general area. The general area may be determined by the location element 732 (e.g., by roaming within a certain geographic range of the starting location). The mobile robot 10 may also interact with users, persons, and other objects within the general area. As yet another example, in embodiments of the invention, the autonomous mode may include a movement detection mode. The movement detection mode may be enabled by a voice command, such as "guard the room." Upon a selection of the movement detection mode, the head will detect a movement in the proximity of the mobile robot 10, such as via the obstacle sensors 728 or via the video camera 730. In some embodiments, the movement is detected by a change in the reflected IR signals. The movement detection may include rotating the head 14 about the z-axis such that the obstacle sensors 728 and/or the video camera 730 obtain a perspective of the entire proximity of the mobile robot 10. The movement detection may also include moving the mobile robot around the proximity. Upon a detection of movement, the mobile robot 10 may sound an alarm, send a message to the user device 702, or perform other functions.

The command module 758 performs specific actions as directed by the user. The command module 758 is enacted to perform the specific action based upon a specific command or instruction (such as a voice command received by the directional microphone 734). For example, a "come here" mode may be enabled by a voice command. In the "come here" mode, the mobile robot 10 detects the location of the user (via IR distance and direction, voice recognition direction, facial recognition, or the like) and moves in proximity to that location. As another example, the user may instruct the mobile robot 10 to perform a certain animation or a random animation. The animation may be entertaining to the user (such as a song or dance), or provide a certain service for the user (for example, "see if there is a person around that corner"). Typically, upon completion of the specific action, the mobile robot 10 will return to the default mode or the autonomous mode.

The power sources 712,722,740,760 may include batteries and other sources of electrical power. The power source 712,722,740,760 may also include a power-generation component such as a solar panel. For example, embodiments of the invention may be utilized as a rover on a distant and hostile environment (such as a moon or planet). In these embodiments, the head 14 and/or the spheroid shell 12 may include a set of solar panels for the generation of electrical power. Solar panels may also be utilized for mobile robot 10s intended for military purposes, as readily available sources of electrical power may not be nearby in these applications. In other embodiments of the invention, the power source 712,722,740,760 may include an internal combustion engine, a hybrid internal combustion engine, or an electric motor.

Various methods of embodiments of the invention will now be discussed. A non-transitory computer readable storage medium having a computer program stored thereon may instruct the at least one processing element to implement the steps of at least one of the described methods. The non-transitory computer readable storage medium may be located within the head 14, within the internal assembly 16, within the user device 702, within an auxiliary computing device, within at least one sensor, and/or within a generic computing device.

The computer program of embodiments of the invention comprises a plurality of code segments executable by a computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, mobile robot 10, and method of embodiments of the invention may be implemented in hardware, software, firmware, or combinations thereof, which broadly comprises server devices, computing devices, and a communications network.

The computer program of embodiments of the invention may be responsive to user input. As defined herein user input may be received from a variety of computing devices including but not limited to the following: desktops, laptops, calculators, telephones, smartphones, smart watches, in-car computers, camera systems, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the mobile robot 10.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communications network. As used herein, the stand-along computer program or web-accessible program provides users with access to an electronic resource from which the users can interact with various embodiments of the invention.

Execution of the computer program of embodiments of the invention performs steps of the method of embodiments of the invention. Because multiple users may be updating information stored, displayed, and acted upon by the computer program, information displayed by the computer program is displayed in real-time. "Real-time" as defined herein is when the processing element of the mobile robot 10 performs the steps less than every 1 second, every 500 milliseconds, every 100 milliseconds, or every 16 milliseconds.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A mobile robot comprising:
   a spheroid shell;
   an internal assembly disposed within the spheroid shell for propelling the mobile robot,
      including—
      a base;
      a drive assembly;
      a pivoting arm pivotably secured to the base,
      wherein the pivoting arm presents a magnetized end configured to be in a first position and a second position,
      a switch configured to detect whether the magnetized end is in the first position or the second position; and
   a head secured to the magnetized end of the pivoting arm through the spheroid shell,
   wherein the head is configured to move relative to the base by the pivoting of the pivoting arm,
   wherein the magnetized end is in the first position while the head is magnetically secured to the pivoting arm,
   wherein the magnetized end is in the second position while the head is not magnetically secured to the pivoting arm.

2. The mobile robot of claim 1,
   wherein the internal assembly is configured to move the mobile robot in the direction of an x-axis by rotating the spheroid shell about a y-axis that is generally perpendicular to the x-axis,
   wherein a z-axis is defined as perpendicular to both the x-axis and the y-axis and oriented generally upward.

3. The mobile robot of claim 2,
   wherein the pivoting arm includes an x-pivot device configured to pivot the magnetized end of the pivoting arm about the x-axis relative to the base,
   wherein the x-pivot device is further configured to laterally move the head secured to the magnetized end of the pivoting arm along an outer surface of the spheroid shell.

4. The mobile robot of claim 2,
   wherein the pivoting arm includes a y-pivot device configured to pivot the magnetized end of the pivoting arm about the y-axis relative to the base,
   wherein the y-pivot device is further configured to laterally move the head secured to the magnetized end of the pivoting arm along an outer surface of the spheroid shell.

5. The mobile robot of claim 2,
   wherein the pivoting arm includes a z-pivot device configured to pivot the magnetized end of the pivoting arm about the z-axis relative to the base, wherein the z-pivot device is further configured to rotate the head secured to the magnetized end of the pivoting arm.

6. The mobile robot of claim 2, wherein the magnetized end of the pivoting arm comprises:
a support plate configured to be in the first position while the head is magnetically secured to the pivoting arm and configured to be in the second position while the head is not magnetically secured to the pivoting arm; and
a set of magnetic protrusions protruding substantially upward from the support plate,
wherein the internal assembly is configured to allow movement upon a detection that the support plate is in the first position and configured to cease movement upon a detection that the support plate is in the second position.

7. The mobile robot of claim 1, wherein the head comprises:
a head housing presenting an interfacing side configured to be magnetically secured against the spheroid shell;
a set of magnetic receptors disposed on the interfacing side and configured to magnetically secure to the magnetized end of the pivoting arm,
wherein the set of magnetic receptors is disposed in a first orientation and the magnetized end is disposed in a corresponding first orientation such that the set of magnetic receptors remains aligned with the magnetized end of the pivoting arm; and
a set of wheels disposed on the interfacing side and configured to allow for traveling in the x-axis direction along the spheroid shell.

8. The mobile robot of claim 7, wherein the head housing further comprises a sensor disposed in the head housing for detecting a condition selected from a group consisting of an obstacle in proximity to the mobile robot, a voice command from a user, and a digital command from a user device.

9. The mobile robot of claim 8, wherein the head further comprises:
a head communications element communicatively coupled to an internal communications element associated with the internal assembly,
wherein the head communications element is configured to send a condition indication to the internal communications element based upon said detected condition by the sensor.

10. The mobile robot of claim 8, wherein the mobile robot further comprises:
a processor configured to perform a task based upon the detected condition,
wherein the task is selected from a group consisting of avoiding the obstacle, performing the voice command, and performing the digital command.

11. The mobile robot of claim 10, wherein the processor is further configured to instruct the internal assembly to move toward a transmitter associated with a user device and to cease movement toward the transmitter upon a signal strength from the transmitter reaching a certain threshold.

12. A mobile robot comprising:
a spheroid shell;
an internal assembly disposed within the spheroid shell for propelling the mobile robot,
including—
a base;
a drive assembly configured to propel the mobile robot by rotating the spheroid shell about the base,
a pivoting arm pivotably secured to the base,
wherein the pivoting arm presents a magnetized end; and
a head secured to the magnetized end of the pivoting arm through the spheroid shell,
wherein the head is configured to move relative to the base by the pivoting of the pivoting arm,
wherein the head comprises:
a head housing presenting an interfacing side configured to be magnetically secured against the spheroid shell;
a set of magnetic receptors disposed on the interfacing side and configured to magnetically secure to the magnetized end of the pivoting arm,
wherein the set of magnetic receptors is disposed in a first orientation and the magnetized end is disposed in a corresponding first orientation such that the set of magnetic receptors remains aligned with the magnetized end of the pivoting arm; and
a set of single-axis wheels disposed on the interfacing side and configured to allow for traveling in the x-axis direction along the spheroid shell.

13. The mobile robot of claim 12,
wherein the internal assembly is configured to move the mobile robot in the direction of an x-axis by rotating the spheroid shell about a y-axis that is generally perpendicular to the x-axis,
wherein a z-axis is defined as perpendicular to both the x-axis and the y-axis and oriented generally upward,
wherein the spheroid shell is rotatably fixed to the drive assembly along the y-axis,
wherein the pivoting arm is configured to pivot about the x-axis, the y-axis, and the z-axis relative to the base.

* * * * *